(12) United States Patent
Wu et al.

(10) Patent No.: US 9,954,744 B2
(45) Date of Patent: Apr. 24, 2018

(54) ESTIMATION OF APPLICATION PERFORMANCE VARIATION WITHOUT A PRIORI KNOWLEDGE OF THE APPLICATION

(71) Applicant: Intel Corporation, Santa Clara, CA (US)

(72) Inventors: Keqiang Wu, San Ramon, CA (US); Kingsum Chow, Portland, OR (US); Ying Feng, Santa Clara, CA (US); Khun Ban, Hillsboro, OR (US); Zhidong Yu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 14/842,438

(22) Filed: Sep. 1, 2015

(65) Prior Publication Data

US 2017/0063652 A1    Mar. 2, 2017

(51) Int. Cl.
*H04L 12/26* (2006.01)

(52) U.S. Cl.
CPC ............ *H04L 43/04* (2013.01); *H04L 43/062* (2013.01); *H04L 43/067* (2013.01)

(58) Field of Classification Search
CPC ...... H04L 43/04; H04L 43/062; H04L 43/067
See application file for complete search history.

(56) References Cited

U.S. PATENT DOCUMENTS 6,845,456 B1 * 1/2005 Menezes ............... G06F 1/3203
713/320

6,988,092 B1 * 1/2006 Tang ....................... G06Q 10/06
705/7.39

(Continued)

FOREIGN PATENT DOCUMENTS

WO    2007-120710 A2    10/2007

OTHER PUBLICATIONS

International Search Report and Written Opinion issued in PCT Application No. PCT/US2016/044376, dated Oct. 21, 2016, 11 pages.

(Continued)

*Primary Examiner* — Oanh Duong
(74) *Attorney, Agent, or Firm* — Grossman Tucker Perreault & Pfleger, PLLC

(57) ABSTRACT

Generally, this disclosure provides systems, devices, methods and computer readable media for estimation of application execution performance variations on a processor, without a priori knowledge of the application. A system may include network traffic data collection circuitry configured to sample a first network traffic statistic, from a network interface circuit associated with the processor, at a first sampling time interval during the application execution. The network traffic data collection circuitry may also be configured to sample a second network traffic statistic from the network interface circuit at a second sampling time interval during the application execution. The system may further include performance analysis circuitry configured to calculate a ratio of the first network traffic statistic to the second network traffic statistic and to estimate the application execution performance variation from the first sampling time interval to the second sampling time interval, wherein the estimation is proportional to the calculated ratio.

18 Claims, 6 Drawing Sheets

(56) References Cited

U.S. PATENT DOCUMENTS

| | | | |
|---|---|---|---|
| 7,577,736 B1* | 8/2009 | Ovenden | H04L 12/14 370/229 |
| 2003/0151619 A1* | 8/2003 | McBride | H04L 41/145 715/736 |
| 2003/0158930 A1 | 8/2003 | McBride | |
| 2007/0011321 A1* | 1/2007 | Huntington | H04L 43/028 709/224 |
| 2010/0165856 A1* | 7/2010 | Melpignano | H04W 28/22 370/252 |
| 2010/0281388 A1 | 11/2010 | Kane et al. | |
| 2011/0199924 A1 | 8/2011 | Breslin et al. | |
| 2011/0317566 A1* | 12/2011 | Keeni | H04L 43/16 370/252 |
| 2012/0076011 A1* | 3/2012 | Gobriel | H04W 52/0258 370/252 |
| 2012/0127871 A1* | 5/2012 | Puthenpura | G06Q 30/0202 370/252 |
| 2012/0200431 A1* | 8/2012 | Ross | G08G 1/054 340/936 |
| 2013/0290969 A1* | 10/2013 | Branson | G06F 9/48 718/102 |
| 2013/0318238 A1 | 11/2013 | Hall et al. | |
| 2013/0322266 A1* | 12/2013 | Maon | H04L 41/14 370/252 |
| 2014/0032736 A1* | 1/2014 | Mounaouar | H04L 43/026 709/224 |
| 2014/0075025 A1* | 3/2014 | Stanforth | H04W 48/14 709/225 |
| 2015/0026318 A1* | 1/2015 | Faraboschi | H04L 41/145 709/221 |
| 2015/0149631 A1* | 5/2015 | Lissack | H04L 41/5051 709/226 |
| 2015/0195174 A1* | 7/2015 | Kogami | H04L 41/0695 709/224 |
| 2015/0317900 A1* | 11/2015 | Tashiro | G01C 21/32 701/117 |
| 2016/0065419 A1* | 3/2016 | Szilagyi | H04L 41/5067 709/224 |
| 2016/0094430 A1* | 3/2016 | Sella | H04L 43/12 370/252 |
| 2016/0248688 A1* | 8/2016 | Barsness | G06F 17/30516 |
| 2016/0301601 A1* | 10/2016 | Anand | H04L 69/22 |
| 2016/0364935 A1* | 12/2016 | Koehler | G06Q 30/0249 |

OTHER PUBLICATIONS

SuperMicro, SuperServer 5086B-TRF (Complete System Only), http://www.supermicro.com/products/system/5U/5086/SYS-5086B-TRF.cfm, 2 pages.

Intel—Oracle OpenWorld Keynote Sep. 28, 2014, http://medianetwork.oracle.com/video/player/3811218654001, 1 page.

Hruska, Joel, "Intel Releases rare details of its custom CPUs for Oracle—and there's a lot more to come," http://www.extremetech.com/computing/180755-intel-releases-rare-details-of-its-customized-oracle-cpus-and-there-a-lot-more-to-come, Jul. 29, 2014, 4 pages.

* cited by examiner

ESTIMATION OF APPLICATION PERFORMANCE VARIATION WITHOUT A PRIORI KNOWLEDGE OF THE APPLICATION

FIELD

The present disclosure relates to application performance estimation, and more particularly, to a system for estimation of application performance variations without a priori knowledge of the application.

BACKGROUND

Hardware vendors are under increased pressure to design processors, computing systems and servers that offer improved performance and scalability, particularly for enterprise application software of the type that is used in larger data centers and businesses. Hardware optimizations may require real-time application performance monitoring in order to implement dynamic optimization techniques. Application software performance, however, often depends on specific software implementation details which are not generally known to the hardware vendor since the software is typically developed by independent software vendors. The hardware vendors generally have no way to predict which specific applications will be running on a given server or what specific behaviors are likely to be associated with those applications.

Existing methods for monitoring software application performance rely on cooperation from the software vendor to develop performance monitoring tools that are specifically tailored to the application. In other words, a priori knowledge of operational details of the application is required. This approach, however, does not allow for a general purpose solution to the performance monitoring problem.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for estimation of application performance or throughput variations over time, without requiring a priori knowledge of the application. The terms "performance" or "throughput" are used to represent some measure of the work accomplished by the software application, the nature of which will generally depend on the application. For example, performance or throughput may represent page downloads per second, transactions per second, jobs per second, user requests processed per second, etc., the direct measurement of which would typically require detailed knowledge of the workings of the application software or reliance on performance monitoring tools provided by the independent software vendor. Embodiments of the present disclosure, however, provide for an indirect estimation of changes in application performance based on measurement of network traffic.

In some embodiments, a system may include network traffic data collection circuitry configured to sample network traffic statistics over multiple time intervals during the execution of the application on a processor. The statistics may be provided by a network interface circuit and may include a count of bytes transmitted and/or received during each time interval. The system may further include performance analysis circuitry configured to calculate a ratio between the network traffic statistics associated with each sampling interval, and to estimate the application execution performance variation from the first sampling time interval to the second sampling time interval based on the calculated ratio.

Figure 1:
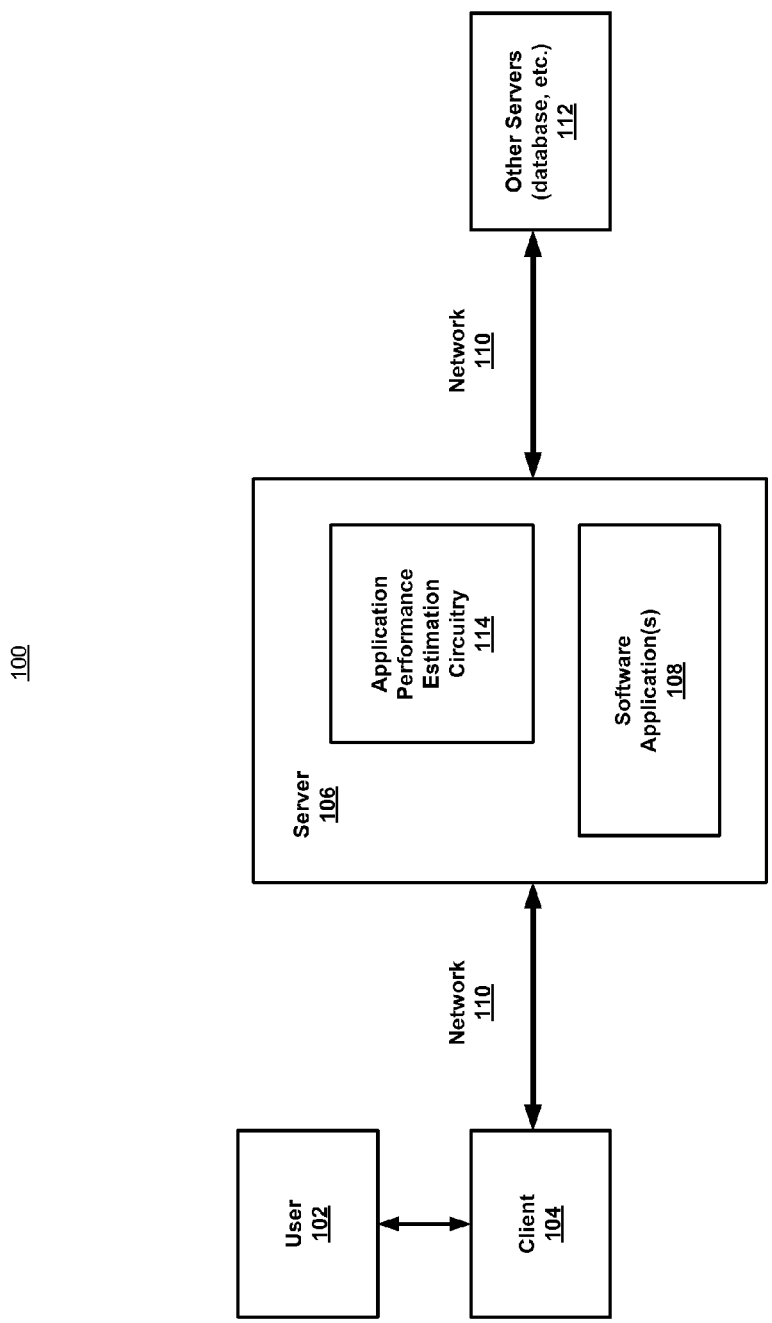
FIG. 1 illustrates a top level system diagram of an example embodiment consistent with the present disclosure.

FIG. 1 illustrates a top level system diagram 100 of one example embodiment consistent with the present disclosure. A user 102 may interact with a local client system 104 to gain access to a remote server system 106 over a network 110. The server system 106 may be configured to host and execute one or more software applications 108. A software application 108 may be a business/enterprise software application including, but not limited to, for example, Customer Relationship Management software, Enterprise Resource Planning software, Human Capital Management software and Business Intelligence software. The server 106 may be configured to provide access to this enterprise application software 108 to many users 102 and client systems 104. In some embodiments, the user may submit requests to the enterprise application software 108 deployed on the server 106 and the enterprise application executes the requests and communicates results back to the user. The enterprise application software 108 may also communicate with other servers 112, such as, for example, database servers. The other servers 112 may be remote to the server 106 and thus communication between them may also be over the network 110.

The server 106 may include multiple CPUs and processing cores any of which may further be configured for hyperthreading operation. The server 106 is also shown to include application performance estimation circuitry 114, configured to monitor application performance/throughput variations over time, as will be described below. Such information may be useful for performance tuning and may be stored and/or reported to other systems and circuits (not shown) provided for that purpose.

Although discussions of various embodiments herein may refer to a server system executing business/enterprise application software, it will be appreciated that the server 106 may be any type of multiprocessor/multicore computation or communication platform and that the software may be any type of software that involves some degree of network communication. In some embodiments, the sever 106 may host a native OS or may be configured to support a virtualization environment that can host multiple operating systems on multiple virtual machines.

Figure 2:
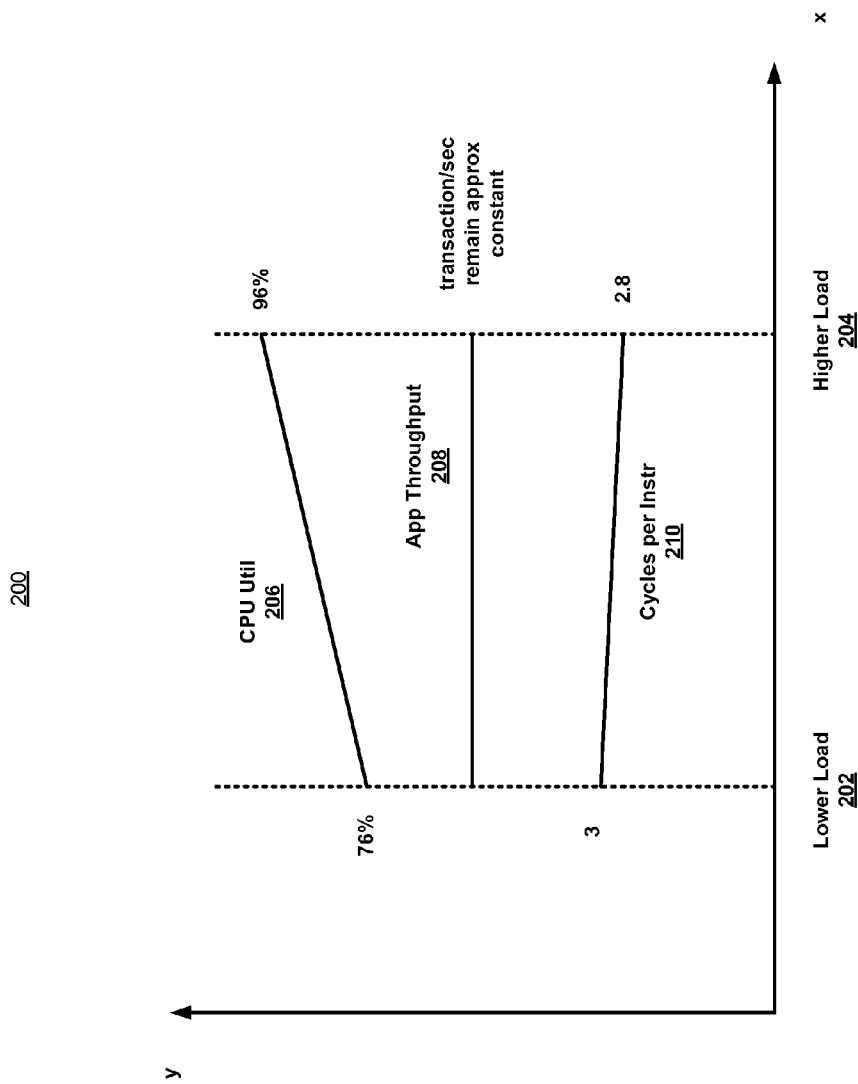
FIG. 2 illustrates various system measurements consistent with embodiments of the present disclosure.

FIG. 2 illustrates various system measurements 200 consistent with embodiments of the present disclosure. Examples of variation in CPU utilization 206, application throughput 208 and cycles per instruction (CPI) 210 are shown along the y axis, as conditions change from a relatively lower load 202 to a relatively higher load 204 along the x axis. The relative load may be associated with the number of concurrent users. For example, the lower load 202 may be associated with a smaller number of users while the higher load 204 may be associated with a greater number of users. As illustrated in this example, as the load increases, the CPU utilization increases from about 76% to 96%, but the application throughput (for instance, in terms of measured transactions per second) remains almost constant. This may be due to an overly simplistic synchronization implementation in the application. For example a spinlock may be used to synchronize the division of work between multiple processors, cores or threads, and, as the load increases, the processor spends more time executing the spin lock (a type of busy/wait loop) rather than performing useful work (e.g., transactions, etc.). Thus, a measurement of CPU utilization may not provide a reliable indication of application performance.

Similarly, the CPI, which is a common metric for indicating how efficiently an instruction is executed on a CPU (e.g., a lower CPI correlates with improved CPU performance), may also not provide a reliable indication of application performance. As shown here the CPI decreases slightly as the application performance remains constant. This is most likely due to the fact that the CPU executes the spinlock with relatively high efficiency, but does not correlate with the performance of useful work by the application.

Test measurements, obtained by examining the behavior of a number of business enterprise software applications during execution, have shown however, that a correlation exists between application performance and network traffic. An example from one of these applications is illustrated in Table 1 below. Here, the number of users was increased from 20 to 40 to 60, representing lower, medium, and higher load cases. For each case, the actual performance of the application, in terms of transactions per second, was measured using specific knowledge related to the particular test application functionality (e.g., knowledge that would not generally be available for any arbitrarily selected application), and is presented in the second row. The third row presents the measured CPU utilization for each case. The fourth and fifth rows present the measured network traffic that was associated with the execution of the application, received and transmitted (in bytes per second) respectively.

Column 5 presents the ratios of these measurements for the case of 40 users versus 20 users, in other words as the load increases from low to medium. Column 6 presents the ratios for the case of 60 users versus 40 users, in other words as the load further increases from medium to high. As can be seen from this data, when the load increases from low to medium, the performance or throughput increases by a factor of 1.439 and the CPU utilization increases by a factor of 1.97 indicating that the CPU utilization is not a good indicator of performance. The network traffic, however, increases by 1.438 (for received bytes/second) and 1.439 for transmitted bytes per second, indicating that this is a good indicator of application performance.

Similar results can be seen in column 6 as the load increases from medium to high. Here, the performance increase appears to slow down (e.g., increasing by a factor of only 1.092) while the CPU utilization continues to increase by a factor of 1.30. Once again, the change in network traffic tracks the change in performance by indicating a factor of 1.092.

TABLE 1

| | # Users (Load) | | | | |
|---|---|---|---|---|---|
| | 20 | 40 | 60 | 40u/20u | 60u/40u |
| Performance (transactions/sec) | 1.22 | 1.75 | 1.92 | 1.439 | 1.092 |
| CPU % Utilization | 37 | 73 | 96 | 1.97 | 1.30 |
| Network Rx (Bytes/sec) | 226K | 324K | 354K | 1.438 | 1.092 |
| Network Tx (Bytes/sec) | 882K | 1269K | 1387K | 1.439 | 1.092 |

Figure 3:
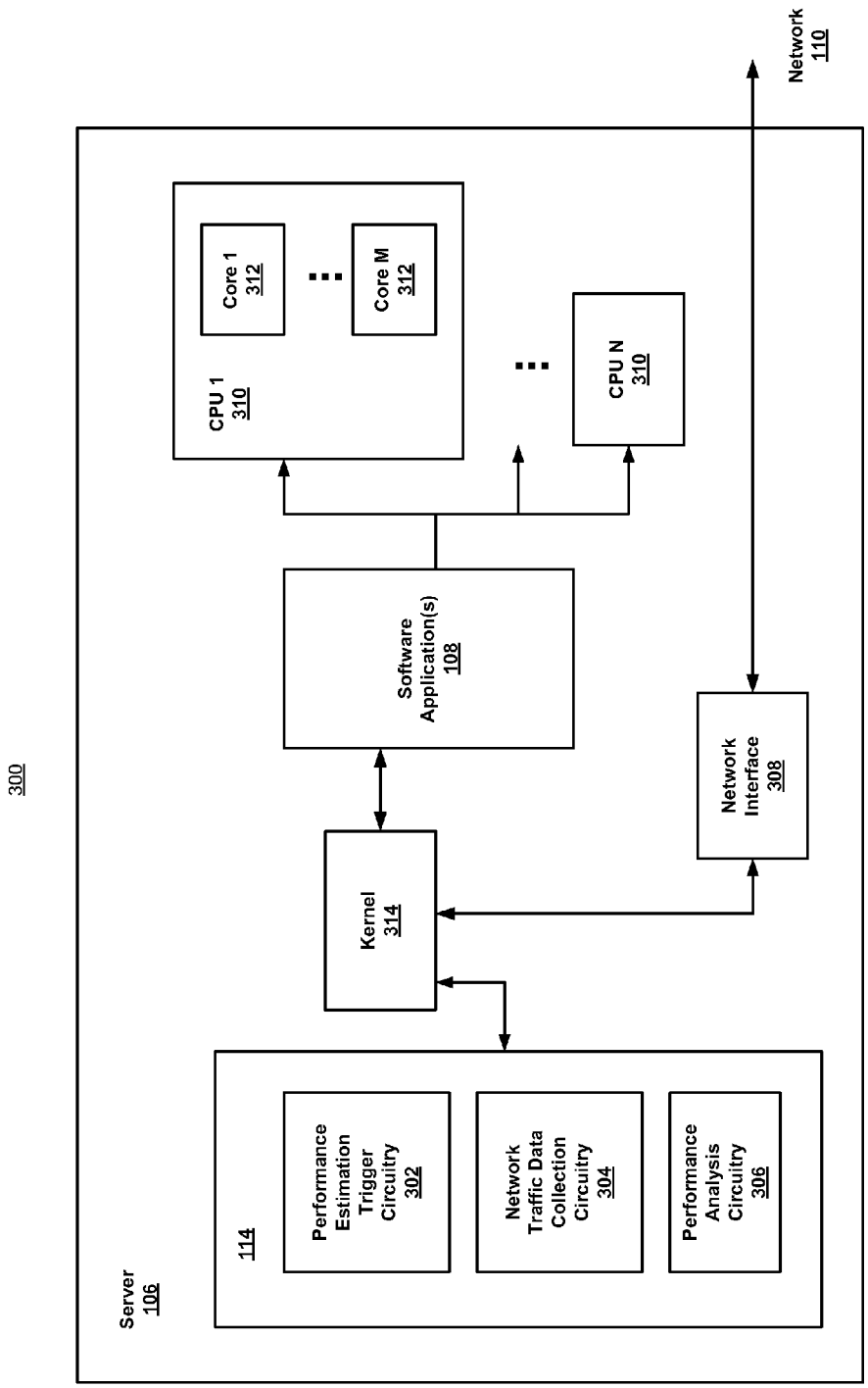
FIG. 3 illustrates a block diagram of another example embodiment consistent with the present disclosure.

FIG. 3 illustrates a block diagram 300 of one example embodiment consistent with the present disclosure. The server 106, is shown to include a Kernel or Operating System (OS) 314, a network interface 308, one or more software applications 108 and the application performance estimation circuitry 114. The application performance estimation circuitry 114 may further include performance estimation trigger circuitry 302, network traffic data collection circuitry 304 and performance analysis circuitry 306, the operations of which will be described in greater detail below. The server 106 is also shown to include a number (N) of CPUs 310, each of which may include a number (M) of processing cores 312. Each core in turn may be configured to execute multiple hardware threads (e.g., logical cores or hyperthreading). The software applications 108 may thus be distributed into component parts (e.g., processes, software threads, etc.) that execute in parallel, to at least some degree, on each CPU, core and/or logical core.

The kernel 314 may be configured to manage the execution of the software applications 108 and to distribute the component processes of those applications among the various CPUs 310 and cores 312.

The network interface 308 may be configured to transmit and receive packets, for example data and/or control packets, over the network 110 allowing for communication between the software applications 108 on server 106 and other remote servers or systems. The network interface 308 may also be configured to measure network traffic (e.g., the number of packets transmitted and/or received over a given time period).

Performance estimation trigger circuitry 302 may be configured to monitor CPU utilization (or any other suitable system metric) and initiate or trigger the performance estimation process when the utilization exceeds a threshold value. In some embodiments this may be useful to avoid consuming resources to estimate application performance during periods when the CPU utilization is so low that application performance is not a concern.

Network traffic data collection circuitry 304 may be configured to gather data (e.g., network traffic statistics) pertaining to the number of bytes transmitted and received through network interface 308, on behalf of the software application, during selected time intervals. In some embodiments, the kernel 314, a network interface device driver in the kernel and/or the network interface circuitry 308 may assist or otherwise take part in this task. For example, the kernel 314 (or network driver) may be configured to maintain tables that track network traffic associated with each application, process or thread.

Performance analysis circuitry 306 may be configured to calculate a ratio of the network traffic statistics collected from different sampling time intervals and estimate the application execution performance variation from a first sampling time interval to a second sampling time interval based on the calculated ratio. The application execution performance variation may be proportional to the ratio and the proportionality scale factor may be set to unity. In some embodiments, the proportionality scale factor may be set to any another suitable value, for example based on experimental results. Performance analysis circuitry 306 may also be configured to combine the number of bytes transmitted and the number of bytes received, for each time interval, prior to calculating the ratio. In some embodiments, the number of bytes transmitted and received may be summed, although other arithmetic operations or methods of combination are possible. Additionally, multiple samples of received and transmitted byte counts may be obtained during each time interval and averaged, which may reduce sampling errors and produce a more reliable estimate.

To illustrate this process with a further example, and with reference to Table 1, Performance estimation trigger circuitry 302 may monitor CPU utilization and initiate performance estimation when the utilization exceeds a threshold and reaches 73% (as in column 3, row 3). Network traffic data collection circuitry 304 may then sample the network traffic, for example 10 times, during a first sampling interval. The average of the samples may yield 324K bytes/sec of received traffic and 1269K bytes/sec of transmitted traffic (as in column 3, rows 4 and five). The sum of received and transmitted traffic during this first interval is 1593K bytes/sec. At a subsequent time, network traffic data collection circuitry 304 may perform another sampling of network traffic, for example 10 times, which may yield an average of 345K bytes/sec of receive traffic and 1387K bytes/sec of transmitted traffic (as in column 4, rows 4 and five). The sum of received and transmitted traffic during this second interval is 1741K bytes/sec. The ratio of network traffic between these two intervals is therefore 1.09, which may be used as the estimated increase in application performance or throughput from the first time interval to the second time interval.

Figure 4:
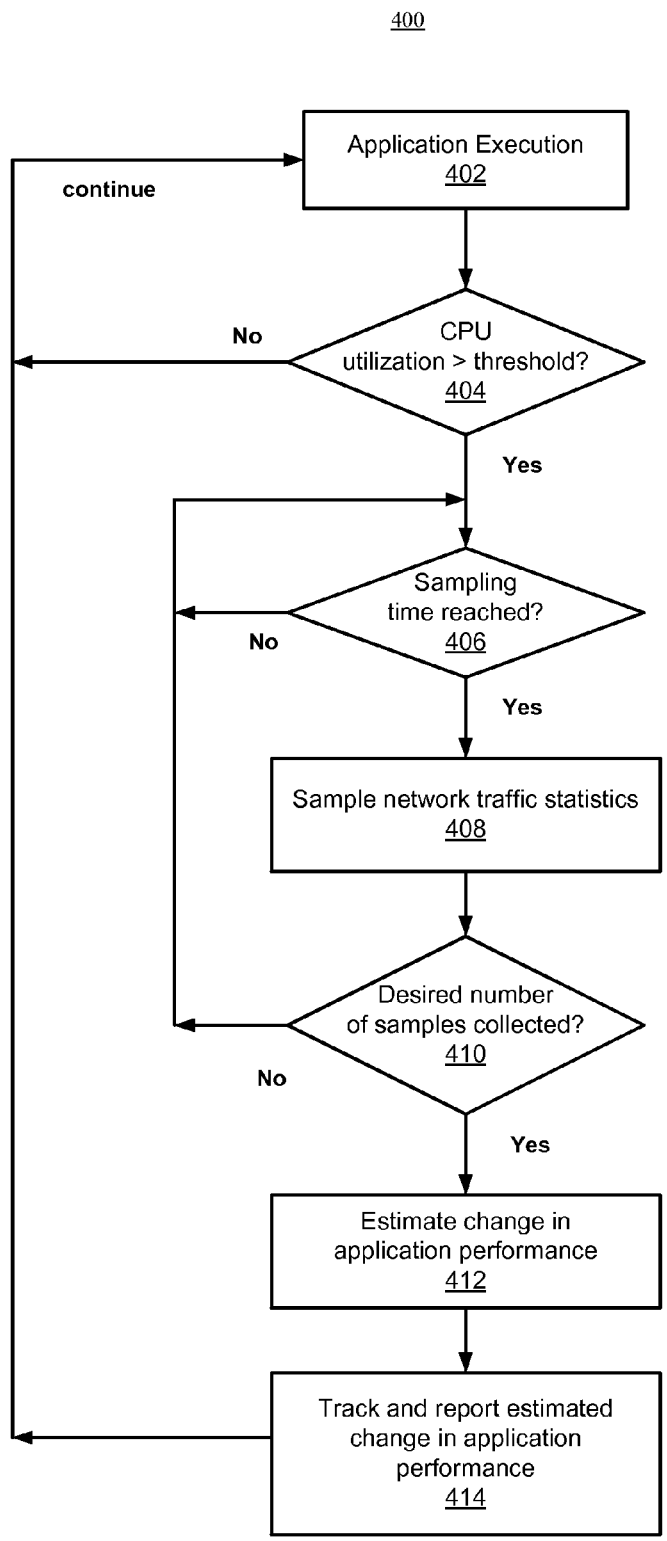
FIG. 4 illustrates a flowchart of operations of one example embodiment consistent with the present disclosure.

FIG. 4 illustrates a flowchart of operations 400 of one example embodiment consistent with the present disclosure. At operation 402, the software application is executing. At operation 404, the CPU utilization is measured and compared to a threshold utilization value. In some embodiments, the threshold utilization value may be in the range of 45 to 55 percent utilization. In some embodiments, if the utilization is less than the threshold value, the load on the system may be small enough that application performance estimation may not be required. For example, any potential performance improvements that may be implemented based on this estimated information may not provide sufficient benefit to justify its use, and so the application is permitted to continue execution without modification.

If the CPU utilization exceeds the threshold, however, then performance estimation may be initiated at operation 406, where a determination is made as to whether the desired time has been reached to begin sampling network traffic statistics. If so, then at operation 408 the network traffic statistics are sampled. These statistics may include the number of bytes received and the number of bytes transmitted by the software application during a selected period of time. At operation 410, if the desired number of samples has not been collected, then control loops back to collect more samples. Otherwise, at operation 412, the change in application performance is estimated based on a ratio of the currently sampled network traffic statistics to previously sampled network traffic statistics. At operation 414, the estimated change in application performance may be tracked over time, stored and/or reported to another module, circuit or entity that may use this information for any purpose including redistribution of processes or threads for improved efficiency. The application is allowed to continue execution, at operation 402.

Figure 5:
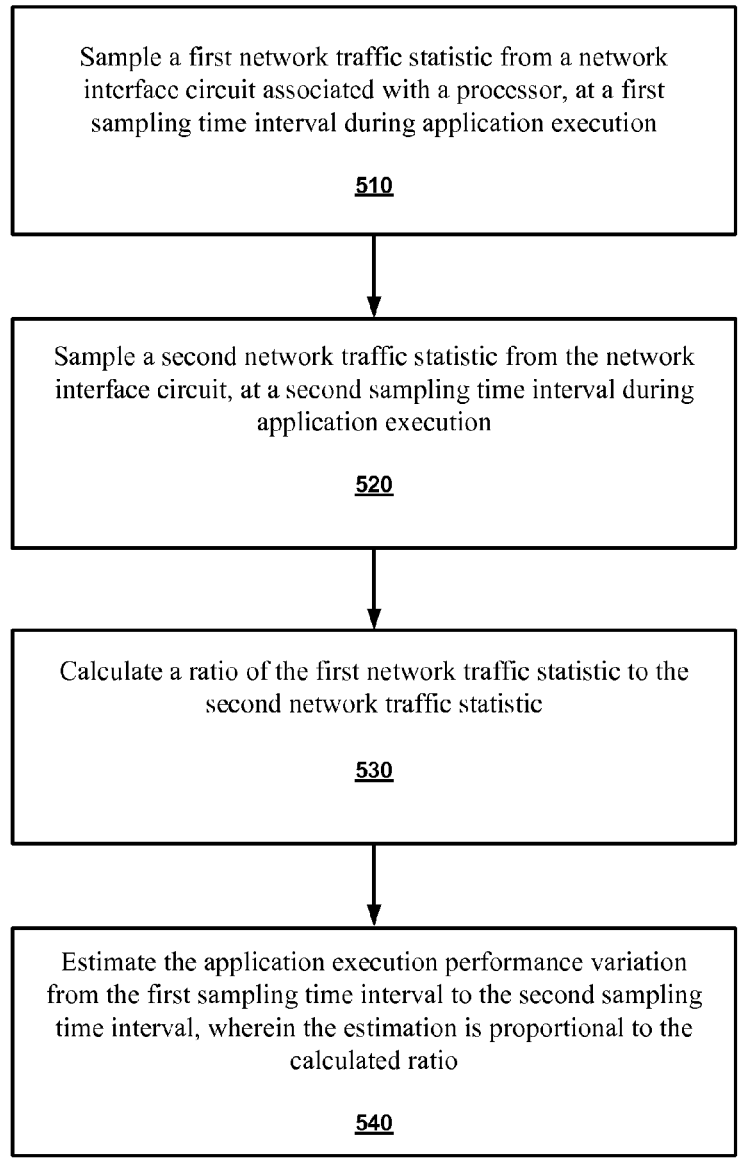
FIG. 5 illustrates a flowchart of operations of another example embodiment consistent with the present disclosure.

FIG. 5 illustrates a flowchart of operations 500 of another example embodiment consistent with the present disclosure. The operations provide a method for estimation of application performance changes without the requirement for a priori knowledge of the application. At operation 510, a first network traffic statistic is sampled from a network interface circuit associated with a processor. The sampling occurs at a first sampling time interval during execution of the application. At operation 520, a second network traffic statistic is sampled from the network interface circuit, at a second sampling time interval during execution of the application. At operation 530, a ratio is calculated of the first network traffic statistic to the second network traffic statistic. At operation 540, the application execution performance variation from the first sampling time interval to the second sampling time interval is estimated. The estimation is proportional to the calculated ratio.

Figure 6:
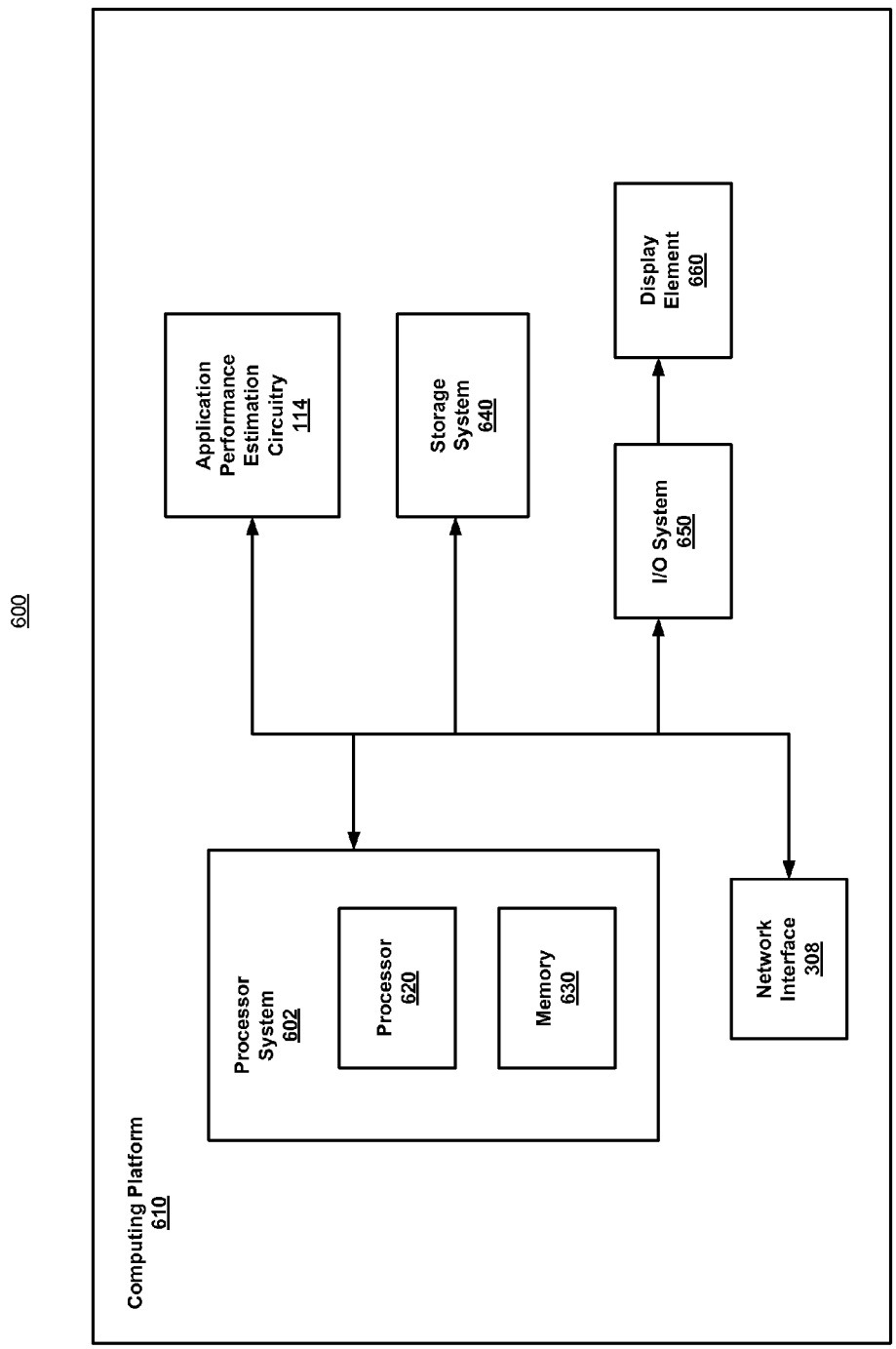
FIG. 6 illustrates a system diagram of a platform of another example embodiment consistent with the present disclosure.

FIG. 6 illustrates a system diagram 600 of one example embodiment consistent with the present disclosure. The system 600 may be a computing platform 610 such as, for example, a server, workstation or desktop computer. It will be appreciated, however, that embodiments of the system described herein are not limited to computing platforms, and in some embodiments, the system 600 may be a communication, entertainment or any other suitable type of device such as, for example, a smart phone, smart tablet, personal digital assistant (PDA), mobile Internet device (MID), convertible tablet, notebook or laptop computer. The device may generally present various interfaces to a user via a display element 660 such as, for example, a touch screen, liquid crystal display (LCD) or any other suitable display type.

The system 600 is shown to include a processor system 602 that may further include any number of processors 620 and memory 630. In some embodiments, the processors 620 may be implemented as any number of processor cores (e.g., HW cores). The processor (or processor cores) may be any type of processor, such as, for example, a general purpose processor, a micro-processor, an embedded processor, a digital signal processor (DSP), a graphics processor (GPU), a network processor, a field programmable gate array or other device configured to execute code. The processors may be multithreaded cores in that the HW cores may include more than one hardware thread context (or "logical core") per HW core. The memory 630 may be coupled to the processors. The memory 630 may be any of a wide variety of memories (including various layers of memory hierarchy and/or memory caches) as are known or otherwise available to those of skill in the art. It will be appreciated that the processors and memory may be configured to store, host and/or execute one or more user applications or other software. These applications may include, but not be limited to, for example, any type of business/enterprise, computation, communication, data management, data storage and/or user interface task. In some embodiments, these applications may employ or interact with any other components of the platform 610.

System 600 is also shown to include network interface circuitry 308 which may include wired or wireless communication capabilities, such as, for example, Ethernet, cellular communications, Wireless Fidelity (WiFi), Bluetooth®, and/or Near Field Communication (NFC). The network communications may conform to or otherwise be compatible with any existing or yet to be developed communication standards including past, current and future version of Ethernet, Bluetooth®, Wi-Fi and mobile phone communication standards.

System 600 is also shown to include an input/output (IO) system or controller 650 which may be configured to enable or manage data communication between processor 620 and other elements of system 600 or other elements (not shown) external to system 600. System 600 is also shown to include a storage system 640, which may be configured, for example, as one or more hard disk drives (HDDs) or solid state drives (SSDs).

System 600 is also shown to include application performance estimation circuitry 114, coupled to the processor system 602, and configured to perform estimation of changes in performance or throughput of software applications executing on the processor system 602, as described previously.

It will be appreciated that in some embodiments, the various components of the system 600 may be combined in a system-on-a-chip (SoC) architecture. In some embodiments, the components may be hardware components, firmware components, software components or any suitable combination of hardware, firmware or software.

"Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for estimation of application performance variations without a priori knowledge of the application. The following examples pertain to further embodiments.

According to Example 1 there is provided a system for estimation of application execution performance variation on a processor. The system may include: network traffic data collection circuitry to sample a first network traffic statistic from a network interface circuit associated with the processor at a first sampling time interval during the application execution, and further to sample a second network traffic statistic from the network interface circuit at a second sampling time interval during the application execution; and performance analysis circuitry to calculate a ratio of the first network traffic statistic to the second network traffic statistic and estimate the application execution performance variation from the first sampling time interval to the second sampling time interval, and the estimation is proportional to the calculated ratio.

Example 2 may include the subject matter of Example 1, and the network traffic statistic is based on a number of bytes transmitted by the application and a number of bytes received by the application during a selected time period.

Example 3 may include the subject matter of Examples 1 and 2, and the network traffic statistic includes a sum of the number of bytes transmitted by the application and the number of bytes received by the application during a selected time period.

Example 4 may include the subject matter of Examples 1-3, and the performance analysis circuitry is further to perform the estimation proportional to the calculated ratio based on a proportionality scale factor of unity.

Example 5 may include the subject matter of Examples 1-4, and the network traffic data collection circuitry is further to average a selected number of samples obtained during the sampling time interval.

Example 6 may include the subject matter of Examples 1-5, further including performance estimation trigger circuitry to measure utilization of the processor and to trigger the estimation of application execution performance variation in response to the measured processor utilization exceeding a threshold.

Example 7 may include the subject matter of Examples 1-6, and the performance analysis circuitry is further to store and report the estimated application execution performance variations.

According to Example 8 there is provided a method for estimation of application execution performance variation on a processor. The method may include: sampling a first network traffic statistic from a network interface circuit associated with the processor, at a first sampling time interval during the application execution; sampling a second network traffic statistic from the network interface circuit, at a second sampling time interval during the application execution; calculating a ratio of the first network traffic statistic to the second network traffic statistic; and estimating the application execution performance variation from the first sampling time interval to the second sampling time interval, and the estimation is proportional to the calculated ratio.

Example 9 may include the subject matter of Example 8, and the network traffic statistic is based on a number of bytes transmitted by the application and a number of bytes received by the application during a selected time period.

Example 10 may include the subject matter of Examples 8 and 9, and the network traffic statistic includes a sum of the number of bytes transmitted by the application and the number of bytes received by the application during a selected time period.

Example 11 may include the subject matter of Examples 8-10, and the estimation proportional to the calculated ratio is based on a proportionality scale factor of unity.

Example 12 may include the subject matter of Examples 8-11, and the sampling further includes averaging a selected number of samples obtained during the sampling time interval.

Example 13 may include the subject matter of Examples 8-12, further including measuring utilization of the processor and triggering the estimation of application execution performance variation in response to the measured processor utilization exceeding a threshold.

Example 14 may include the subject matter of Examples 8-13, further including storing and reporting the estimated application execution performance variations.

According to Example 15 there is provided at least one computer-readable storage medium having instructions stored thereon which when executed by a processor result in the following operations for estimation of application performance variation. The operations may include: sampling a first network traffic statistic from a network interface circuit associated with the processor, at a first sampling time interval during the application execution; sampling a second network traffic statistic from the network interface circuit, at a second sampling time interval during the application execution; calculating a ratio of the first network traffic statistic to the second network traffic statistic; and estimating the application execution performance variation from the first sampling time interval to the second sampling time interval, and the estimation is proportional to the calculated ratio.

Example 16 may include the subject matter of Example 15, and the network traffic statistic is based on a number of bytes transmitted by the application and a number of bytes received by the application during a selected time period.

Example 17 may include the subject matter of Examples 15 and 16, and the network traffic statistic includes a sum of the number of bytes transmitted by the application and the number of bytes received by the application during a selected time period.

Example 18 may include the subject matter of Examples 15-17, and the estimation proportional to the calculated ratio is based on a proportionality scale factor of unity.

Example 19 may include the subject matter of Examples 15-18, and the sampling further includes averaging a selected number of samples obtained during the sampling time interval.

Example 20 may include the subject matter of Examples 15-19, further including measuring utilization of the processor and triggering the estimation of application execution performance variation in response to the measured processor utilization exceeding a threshold.

Example 21 may include the subject matter of Examples 15-20, further including storing and reporting the estimated application execution performance variations.

According to Example 22 there is provided a system for estimation of application execution performance variation on a processor. The system may include: means for sampling a first network traffic statistic from a network interface circuit associated with the processor, at a first sampling time interval during the application execution; means for sampling a second network traffic statistic from the network interface circuit, at a second sampling time interval during the application execution; means for calculating a ratio of the first network traffic statistic to the second network traffic statistic; and means for estimating the application execution performance variation from the first sampling time interval to the second sampling time interval, and the estimation is proportional to the calculated ratio.

Example 23 may include the subject matter of Example 22, and the network traffic statistic is based on a number of bytes transmitted by the application and a number of bytes received by the application during a selected time period.

Example 24 may include the subject matter of Examples 22 and 23, and the network traffic statistic includes a sum of the number of bytes transmitted by the application and the number of bytes received by the application during a selected time period.

Example 25 may include the subject matter of Examples 22-24, and the estimation proportional to the calculated ratio is based on a proportionality scale factor of unity.

Example 26 may include the subject matter of Examples 22-25, and the means for sampling further includes means for averaging a selected number of samples obtained during the sampling time interval.

Example 27 may include the subject matter of Examples 22-26, further including means for measuring utilization of the processor and means for triggering the estimation of application execution performance variation in response to the measured processor utilization exceeding a threshold.

Example 28 may include the subject matter of Examples 22-27, further including means for storing and reporting the estimated application execution performance variations.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for estimating execution performance variation of an application on a processor without a priori knowledge of the application, said system comprising:
   network traffic data collection circuitry to sample a first network traffic statistic from a network interface circuit associated with said processor at a first sampling time interval during execution of said application on said processor, and further to sample a second network traffic statistic from said network interface circuit at a second sampling time interval during execution of said application on said processor, wherein the first network traffic statistic comprises a first sum of total data received by said application and total data transmitted by said application over the first sampling time interval and the second network traffic statistic comprises a second sum of total data received by said application and total data transmitted by said application over the second sampling time interval; and
   performance analysis circuitry to calculate a ratio of said first network traffic statistic to said second network traffic statistic and to estimate said execution performance variation of said application from said first sampling time interval to said second sampling time interval based on the calculated ratio, wherein said estimate is proportional to said calculated ratio.

2. The system of claim 1, wherein said first sum is of a total number of bytes transmitted by said application and a total number of bytes received by said application over said first sampling time interval, and the second sum is of a total number of bytes transmitted by said application and a total number of bytes received by said application over the second sampling time interval.

3. The system of claim 1, wherein said performance analysis circuitry is further to perform said estimate is proportional to said calculated ratio based on a proportionality scale factor of unity.

4. The system of claim 1, wherein said network traffic data collection circuitry is further to average a selected number of samples obtained during said sampling time interval.

5. The system of claim 1, further comprising performance estimation trigger circuitry to measure utilization of said processor and to trigger sampling of said first network traffic statistic when a measured processor utilization exceeds a threshold.

6. The system of claim 1, wherein said performance analysis circuitry is further to store and report said estimate.

7. A method for estimating execution performance variation of an of application on a processor without a priori knowledge of the application, said method comprising:
   sampling a first network traffic statistic from a network interface circuit associated with said processor, at a first sampling time interval during execution of said application on said processor, said first network traffic statistic comprising a first sum of total data received by said application and total data transmitted by said application over the first sampling time interval;
   sampling a second network traffic statistic from said network interface circuit, at a second sampling time interval during execution of said application on said processor, said second network traffic statistic comprising a second sum of total data received by said application and total data transmitted by said application over the second sampling time interval;
   calculating a ratio of said first network traffic statistic to said second network traffic statistic; and
   determining an estimate of execution performance variation of said application from said first sampling time interval to said second sampling time interval based on the calculated ratio, wherein said estimate is proportional to said calculated ratio.

8. The method of claim 7, wherein said first sum is of a total number of bytes transmitted by said application and a total number of bytes received by said application over said first sampling time interval, and the second sum is of a total number of bytes transmitted by said application and a total number of bytes received by said application over the second sampling time interval.

9. The method of claim 7, wherein said estimate is proportional to said calculated ratio based on a proportionality scale factor of unity.

10. The method of claim 7, wherein said sampling said first network traffic statistic and sampling said second network traffic statistic comprises averaging a selected number of samples obtained during said first sampling time interval and said second sampling time interval, respectively.

11. The method of claim 7, further comprising measuring utilization of said processor and triggering said sampling of said first network traffic statistic when a measured processor utilization exceeds a threshold.

12. The method of claim 7, further comprising storing and reporting said estimate.

13. At least one non-transitory computer-readable storage medium having instructions stored thereon which when executed by a processor result in the following operations for estimating execution performance variation of an application executed on a processor without a priori knowledge of the application, said operations comprising:
   sampling a first network traffic statistic from a network interface circuit associated with said processor, at a first sampling time interval during execution of said application on said processor, said first network traffic statistic comprising a first sum of total data received by said application and total data transmitted by said application over the first sampling time interval;
   sampling a second network traffic statistic from said network interface circuit, at a second sampling time interval during execution of said application on said processor, said second network traffic statistic comprising a second sum of total data received by said application and total data transmitted by said application over the second sampling time interval;
   calculating a ratio of said first network traffic statistic to said second network traffic statistic; and
   determining an estimate of execution performance variation of said application from said first sampling time interval to said second sampling time interval based on the calculated ratio, wherein said estimate is proportional to said calculated ratio.

14. The non-transitory computer-readable storage medium of claim 13, wherein said first sum is of a total number of bytes transmitted by said application and a total number of bytes received by said application over said first sampling time interval, and the second sum is of a total number of bytes transmitted by said application and a total number of bytes received by said application over the second sampling time interval.

15. The non-transitory computer-readable storage medium of claim 13, wherein said estimate is proportional to said calculated ratio based on a proportionality scale factor of unity.

16. The non-transitory computer-readable storage medium of claim 13, wherein said sampling said first network traffic statistic and sampling said second network traffic statistic comprises averaging a selected number of samples obtained during said first sampling time interval and said second sampling time interval, respectively.

17. The non-transitory computer-readable storage medium of claim 13, further comprising measuring utilization of said processor and triggering said sampling of said first network traffic statistic when a measured processor utilization exceeds a threshold.

18. The non-transitory computer-readable storage medium of claim 13, further comprising storing and reporting said estimate.

* * * * *